United States Patent [19]

McGill et al.

[11] 3,780,628

[45] Dec. 25, 1973

[54] FILM SHAPING APPARATUS

[75] Inventors: Robert W. McGill, Stow; P. Eric Painter, Northfield, both of Ohio

[73] Assignee: A-T-O Inc., Willoughby, Ohio

[22] Filed: Mar. 13, 1972

[21] Appl. No.: 234,089

[52] U.S. Cl. .................................... 93/82, 53/177
[51] Int. Cl. ........................... B31b 1/38, B65b 9/06
[58] Field of Search .................... 53/48, 177, 180, 53/182, 183, 184; 93/77 R, 82, 12 R, 20; 156/203, 466

[56] References Cited
UNITED STATES PATENTS

| 3,431,831 | 3/1969 | McGill et al. | 93/82 |
| 3,127,819 | 4/1964 | Woolsey | 93/82 |
| 3,482,491 | 12/1969 | Gustafson | 156/466 X |
| 3,125,008 | 3/1964 | Herdina | 93/82 |

Primary Examiner—Robert L. Spruill
Attorney—Vern L. Oldham et al.

[57] ABSTRACT

A film forming apparatus or collar is provided for having a continuous sheet of flexible film led thereover for shaping into an enclosure tube for receiving articles fed thereinto for packaging purposes and it includes a top plate having a trapezoidal form with a short front end and a wide rear end and forwardly converging side edges. Parallel side plates depend from the top plate and guide bar means are operatively positioned underneath the guide plate to fold the film around the side edges thereof as well as the front end of the guide plate, the film moving downwardly to be formed into the enclosure. A front roller is positioned at the front end of the guide plate and is adjustable in position to protrude forwardly or upwardly slightly from the front end of the guide plate and provide maximum tension on a center portion of the film as fed to and folded around the guide plate and downwardly over the front roller. The apparatus also includes a removable nose assembly on which the front roller is positioned and a second guide roller is positioned on such nose assembly with the center portion of the film passing down to and rearwardly around the second guide roller.

10 Claims, 11 Drawing Figures

FILM SHAPING APPARATUS

The present invention particularly relates to the packaging field, particularly for packaging a plurality of articles in an enclosure and wherein a stream of articles are fed into the apparatus and a strip of film is fed to the apparatus or film forming collar to move upstream of the article feed flow and then to be folded into an enclosure and moved rearwardly upon itself around the articles for ultimate packaging action.

BACKGROUND OF THE INVENTION

The present invention particularly relates to a package assembly film folding collar such as is shown in U.S. Pat. No. 3,431,831. While a number of machines like that shown in said patent have been produced and are in successful commercial use today, it is desired to widen the field of packaging films that can be used with such prior type of apparatus and to facilitate the film shaping action. Furthermore, in some instances, it has been difficult to process and fold films effectively in the previous apparatus and the film in some instances has caught on or snagged on portions of the film folding collar.

The general object of the present invention is to provide an improved film folding collar for use in packaging operations and wherein a center portion of the film can be primarily tensioned during the film folding action whereby passage of the film through the film folding collar is facilitated.

Another object of the invention is to provide a removable nose assembly in a film forming collar whereby the height of articles being processed in the collar can be readily changed by change of only one unit in the apparatus.

Other objects of the invention are to avoid snagging the film in the film folding collar as the film moves therethrough; to improve the tracking of the film and the forming of a tubular enclosure therefrom; to provide adjustment in the apparatus for handling various height of containers or articles therein readily; and in general to improve the previously known apparatus of the same general type.

The foregoing and other objects and advantages of the invention will be made more apparent as the specification proceeds.

Attention now particularly is directed to the accompanying drawings, wherein.

When referring to corresponding members shown in the drawings and referred to in the specification, corresponding numerals are used to facilitate comparison therebetween.

INVENTIVE SUBJECT MATTER

The invention comprises, as one embodiment thereof, a film forming collar for shaping a film into an enclosure tube and including a top plate having a trapezoidal form with a short front end and wide rear end and forwardly converging side edges at 45° angles to the axis of the trapezoid, a pair of parallel side plates depending from the top plate, a continuous film being adapted to be fed forwardly of the top plate from the rear end thereof, and guide bar means positioned under the top plate and adapted to be parallel when operative, and extend rearwardly from the front end of the top plate at the edges thereof to fold the film about the side edges of the top plate, and including the improvement of a front roller operatively positioned at the front edge of the top plate and adapted to protrude therefrom whereby a center portion of the film led over the front roller is primarily tensioned in movement of the film through the collar and this reduces the friction of passage of the film over the top plate and around the side edges thereof. The invention further comprises the provision of a second roller positioned below the first roller and in a common vertical plane therewith, the film passing over and rearwardly from said second roller, the two rollers being provided on a replaceable nose assembly secured to the apparatus, and bottom plates completing the film forming collar and a substantially rectangular opening formed therein. Guide means are provided for engaging lateral edge portions of the film as it is moved past the film forming collar to draw the edges inwardly of the enclosure form. The film is suitably drawn through the film forming collar as by receiving a continuous stream of abutted articles in the tube or enclosure formed by the film.

Reference also is particularly made to the construction as fully shown and described in U.S. Pat. No. 3,431,831 and the flow or movement path of the film as being led into and through the film folding collar of the invention. A stream of abutted articles also is fed to and through the film forming collar. In general, the path of movement of the film is the same in the present apparatus as that previously patented. Also the apparatus is for use in a packaging machine as shown in the patent.

Figure 1:
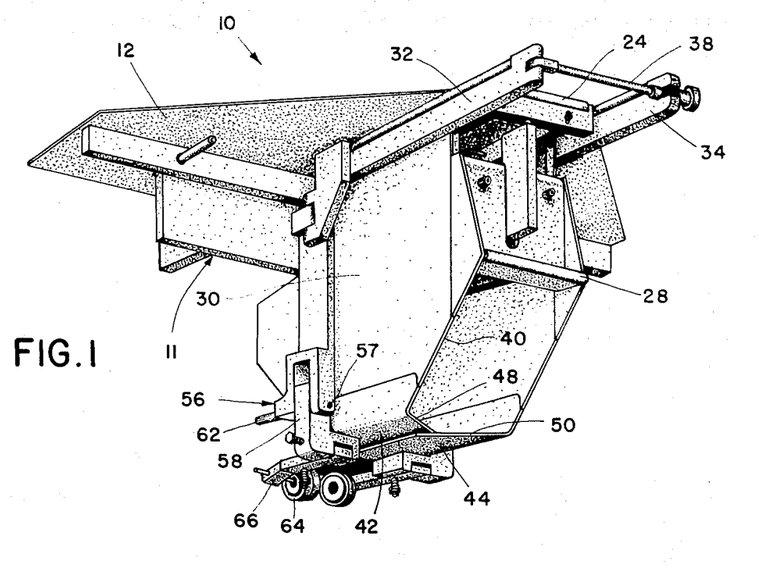
FIG. 1 is an upwardly looking perspective view of apparatus embodying the principles of the invention.
Figure 2:
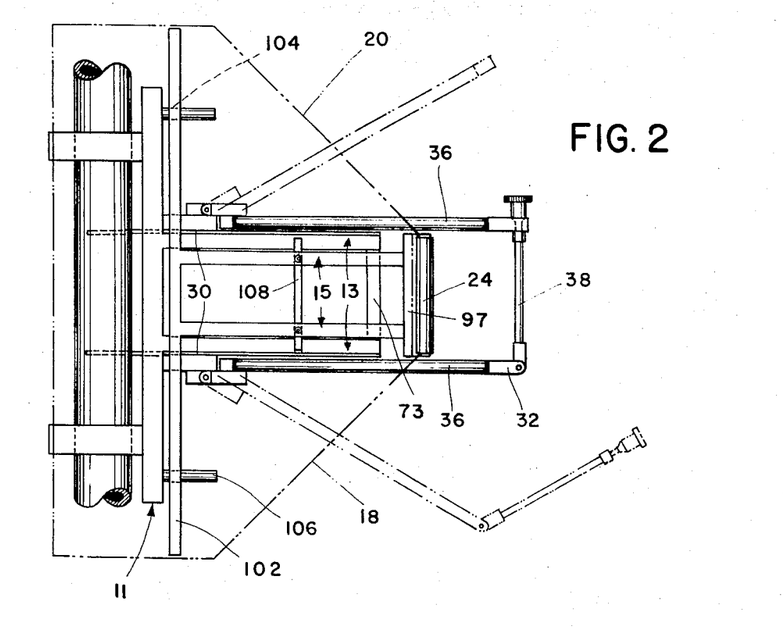
FIG. 2 is a plan view of the film forming collar of FIG. 1 with the top plate being indicated diagrammatically.

With reference to the details of the structure shown in the drawings, FIG. 1 shows the film forming collar of the invention and it is indicated as a whole by the numeral 10. The collar has a suitable frame 11 that is attached to a portion of the packaging machine. This apparatus is adapted to have a continuous sheet of a plastic film or other flexible enclosure forming means continuously supplied thereto from the rear end of the collar in any known manner. Thus, this collar 10 includes a top or guide plate 12 which is of trapezoidal shape and which has a relatively long rear or base edge 14, a relatively short front or upstream end or edge 16, and a pair of converging side edges 18 and 20. These side edges extend at angles of 45° to the front edge 16 of this guide plate. The guide plate 12 is horizontally positioned and the film to be processed and used in forming an enclosure is fed forwardly of the guide plate 12 in the direction indicated by the arrow 22 in FIG. 4 with lateral margins of the film being adapted to be folded down and around the side edges 18 and 20 and with the center portion of the film moving over and downwardly of the front edge 16 of the guide plate.

It is an important feature of the present invention that the guide plate 12 is provided with a front edge roller 24. This front roller 24 is suitably positioned within a recess 26 provided at the front edge of the guide plate and is adjustable with relation thereto as hereinafter described. Actually substantially all of the theoretical front edge 16 is removed by formation of the recess 26 which extends the width of the theoretical front edge of the top plate. The center portion of the film next moves downwardly of the collar 10 and passes over a second or lower guide roller 28 positioned below the front roller 24.

Figure 4:
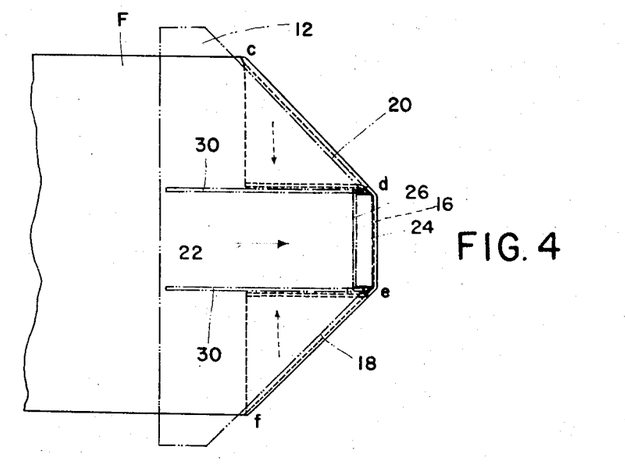
FIG. 4 is a fragmentary somewhat diagrammatic view showing the top plate of the film forming collar and the film as being folded therearound.

As in the previous embodiment of the present apparatus, a pair of side plates 30 are provided in the apparatus and are suitably carried by an internal frame 13 for the collar 10, the side plates 30 being parallel with each other and being dependent from the guide plate 12. The side plates 30 are indicated in FIG. 4 and are in alignment with the ends of the front edge 16 of the guide plate. So as to aid in folding the film being processed into the desired enclosure or tube, a pair of guide bars 32 and 34 are pivotally secured to the frame 11 of the apparatus. The guide bars extend forwardly of the guide plate and this is upstream in relation to movement of articles into and through the collar 10 for packaging action. These guide bars, as a further feature of the present invention, are provided with elongate top rollers 36 suitably journalled thereon in planes defined by the guide bars 32 and 34. The rollers 36 extend the operative folding length of the guide bars. The guide bars 32 and 34 can be locked into operative position adjacent the side plates 30 by means of a connector link 38 that is pivotally carried by the guide bar 32 and is adapted to engage with the upstream end of the guide bar 34. The drawings further show that the guide bars 32 and 34 are positioned immediately adjacent the side plates 30 on the outer surface thereof whereby when lateral portions of the film being shaped by the apparatus are folded over the edges 18 and 20 and then threaded over the rollers 36, the guide bars then can be swung underneath the guide plate 12. Thus, lateral marginal portions of the film will be drawn over the side edges 18 and 20 of the guide plate and will be moved into association with the side plates 30 for downward movement therealong. The side plates 30 also include upwardly and forwardly inclined lower edges or corners 40 over which portions of the film are folded to shape the film to move back inwardly through a substantially rectangular opening formed between the side plates, and the second guide roller 28 together with bottom plates in the collar as hereinafter described. These corner edges 40 extend at a 45° angle to the horizontal.

Figure 3:
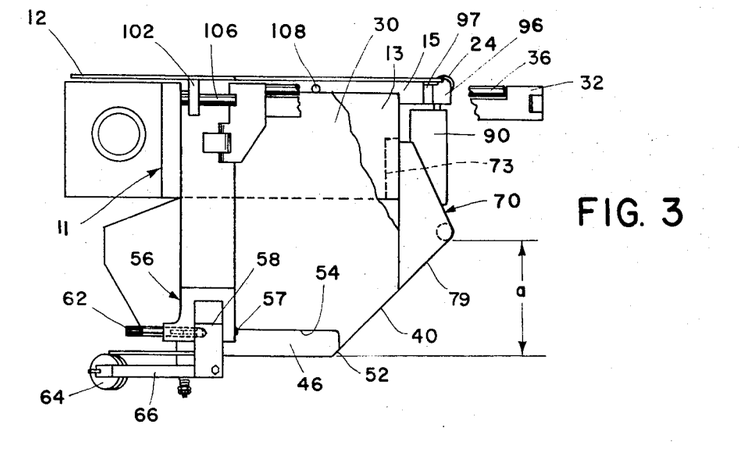
FIG. 3 is a side elevation of the apparatus of FIG. 1.

FIGS. 1 and 3 of the drawings also show that a pair of bottom plates 42 and 44 are provided in the apparatus with one bottom plate being carried by each of the side plates 30 at the lower margin thereof. These bottom plates each include a relatively short vertically upwardly extending section 46 and a horizontal section 48 when the bottom plates are operatively positioned. The bottom plates also include leading or front edges 50 which are at angles of 45° to the axes of the guide rollers 24 and 28 so that the outermost lateral margins of the film can be folded therearound to overlap each other as the film is drawn back through the folding collar 10 of the invention. Thus, an enclosure tube T is formed by the film supplied which obviously is provided of the necessary width for the enclosure to be formed. Yet a further feature of the present invention is that the upwardly extending sections 46 of these bottom plates each include a short angle or edge 52 that is so positioned in the apparatus as to form a continuation of the corner edges 40 of the side plates to facilitate folding portions of the film moving vertically downwardly of the side plates around the upwardly slanted corner edges 40 of the side plates and their continuation by the slanted edge 52 of the bottom plate. This upwardly extending section 46 of the bottom plates also blends in smoothly with and is complementary to a vertically extending edge of a recess 54 provided in the lower margins of the side plates and which extends vertically above the lowermost tip of the corner edges 40 of the side plates. This particular correlation of the upwardly extending sections 46 of the bottom plates with the side plates has provided an unexpected result of preventing snagging or tearing of the film as it moves downwardly of the side plates and around the corners or edges 40 thereof, as extended by the slanted edges 52. The sections 46 lie in the planes of the side plates 30.

The bottom plates 42 are pivotally secured to the collar frame 11 by suitable hinges 56. These hinges 46 include a bracket 58, of L-shape, which is on the outer downstream surface of the bottom plates and is suitably secured thereto and with the actual hinge pintle 60 being above and laterally outwardly positioned in relation to the remaining portions of the bottom plates. A lock pin or detent 62 is provided in the hinge so that when the lock pin 62 is pulled axially outwardly, the bottom plates may be swung downwardly and outwardly of their operative position as shown in FIG. 1 to facilitate threading film into the apparatus. The bottom plates can be locked in this inoperative threading position by a second recess or aperture provided for engagement with the lock pin 62 whereby the bottom plates can be locked in either operative position or inoperative threading position, as desired.

Yet another element of the apparatus that aids in obtaining desired tracking and shaping of the film being processed is the provision of a guide roll 64 on a resiliently positioned arm 66 carried on the lower surface of the individual bottom plates. The rolls 64 are inclined axially inwardly of the collar and are downstream of the bottom plates to engage film as moved through the collar after it has been shaped into the enclosure T and has received the articles to be packaged therein. Hence, these guides or rolls 64 aid in the final positioning of the laterally outermost edges of the film being processed. It also will be seen that FIG. 1 shows that the horizontal sections of the bottom plates, when operatively positioned, overlap each other to be certain that the film being processed will have overlapped edge portions which thereafter can be secured together.

Figure 5:
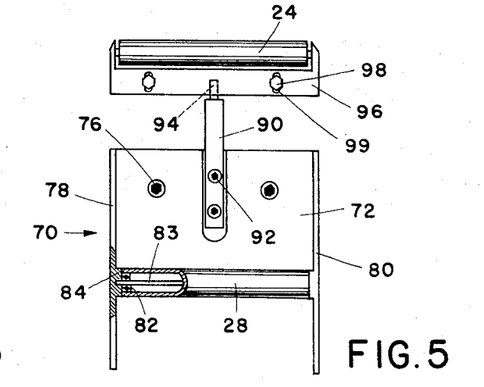
FIG. 5 is an enlarged front elevation of the nose assembly and associated means of the film forming collar.
Figure 6:
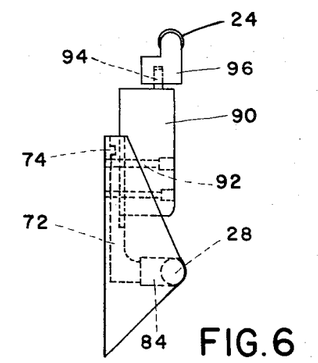
FIG. 6 is a side elevation of the nose assembly of FIG. 5.
Figure 7:
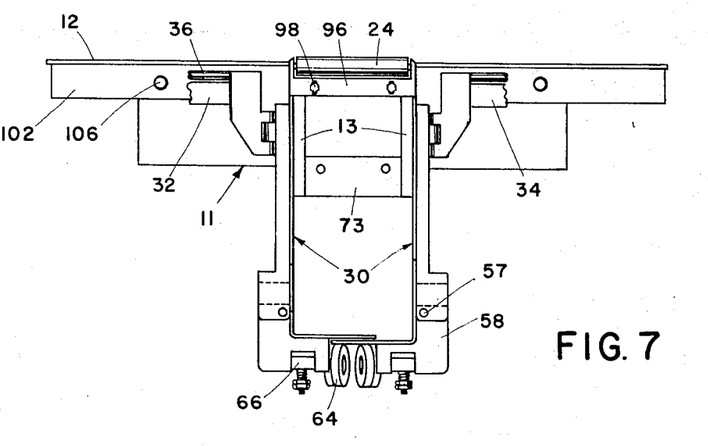
FIG. 7 is a front elevation of the apparatus of FIG. 1.

Additional details of the removable nose portion or assembly 70 of the collar 10 are shown in FIGS. 5 and 6 to illustrate the positioning of the guide rollers in the apparatus. The nose assembly 70 includes a support block 72 which is adapted to be secured to a front cross member 73 on the internal frame 13 of the collar, which support block 72 has a horizontally extending recess 74 formed therein for engaging with a complementary rib provided on the internal frame to locate the nose assembly 70 in fixed vertical relation to the remainder of the apparatus. Suitable cap screws 76 or equivalent are used to secure the support block 72 on this internal frame of the collar. A pair of edge plates 78 and 80 are secured to opposed lateral margins of the block 72 in any suitable manner. The second guide roll 28, as previously identified, is journalled on this nose assembly as by bearings 82 on a support rod 83 mounted on and extending between supports such as plates or bars 84 secured to or formed integrally with the block 72 and/or the edge plates 78 and 80.

In order to correlate the position of the front roller 24 in relation to the second guide roller 28, the nose assembly 70 includes a support 90 which extends vertically of the apparatus and protrudes upwardly from the other block 72. This elongated block 90 is secured to the support block 72 as by cap screws 92 and it terminates in an upwardly extending guide or pin 94. This pin 94, in turn, is adapted to engage with a bracket 96 in which the front roller 24 is journalled. The bracket 96 is hence located in the same vertical plane as the second guide roller 28 whereas the actual vertical position of the front roller 24 is controlled by means of a pair of cap screws 98 which secure the bracket to a cross member 97 forming a portion of the internal frame 13. The screws 98 extend through vertically extending slots 99 provided in the bracket 96 to permit accurate adjustment of the roller in relation to the horizontal plane of the guide plate.

To vary the axial relationship of the rollers 24 and 28 with relation to the front edge 16 of the guide plate 12, any suitable shims can be placed between the blocks 90 and 70 as well as behind the positioning means for the guide roller 28, or behind the support block 72. Hence, the position of the top edge of the front roller can be accurately controlled whereby normally the guide roller 24 is adapted to have its upper surface protruding slightly above and, if desired, slightly forwardly of the theoretical front edge 16 of the guide plate. This construction tensions a central portion of the film being processed more than lateral portions thereof, and this reduces the friction of engagement of the film with the side edges 18 and 20 and with the rollers 36 on the guide bars whereby a low friction traveling contact is obtained between the film being folded or shaped to enclosure form and the apparatus of the invention.

It also is a feature of the invention that the guide plate 12 is slidably positioned for movement in a horizontal plane in the apparatus. To this end, the guide plate 12 has a downwardly extending bar 102 secured to it adjacent its rear edge and which bar extends transversely of the guide plate and has a pair of apertures 104 formed therein. Frame means 15 also are secured to the bar 102 and they are slidably positioned intermediate the fixed inner frame 13. Guide pins 106 carried by a portion of the frame 11 and protruding upstream in the apparatus extend through the apertures 104 to limit the guide plate to movement along its longitudinal axis. In addition, the guide plate 12 is secured to and supported by means of a cross pin 108 that engages the frame means 15. The cross pin 108 can be received in and extend between longitudinally extending slots provided in spaced parallel portions of the fixed internal frame 13 of the collar or the pin may slide on the upper surface of portions of the frame 13. The pin 108 is suitably secured to the guide plate 12, as by cap screws or the like.

It will be seen that by making the nose assembly 70 removable, when desired, one nose assembly can be removed from the apparatus by merely taking out the pair of cap screws 76 that hold the guide assembly in place. By virtue of the particular ribbed and recessed construction of adjacent portions of the nose assembly and corresponding parts of the internal frame 13 of the collar, this nose assembly must be moved forwardly of the apparatus to be dropped therefrom. Then, a replacement nose assembly having a different vertical spacing of the two rollers 24 and 28 can be repositioned in the apparatus to vary the size of the enclosure formed between the lower or second guide roller 28 and the bottom plates 42 and 44.

FIG. 3 of the drawings best shows that the side plates or edge plates 78 and 80 in the nose assembly have edge sections 79 which extend at an angle of 45° to a horizontal plane. The edge plates 78 and 80 are in the planes of the side plates 30 whereby these edges 79 form an upwardly and forwardly extending continuation of the corners or edges 40 of the side plates. Hence, laterally spaced portions of the film are folded around these edges of the nose assembly in association with the adjacent portions of the side plates and the upwardly extending sections of the bottom plates so that a smooth film folding action can be obtained.

Figure 9:
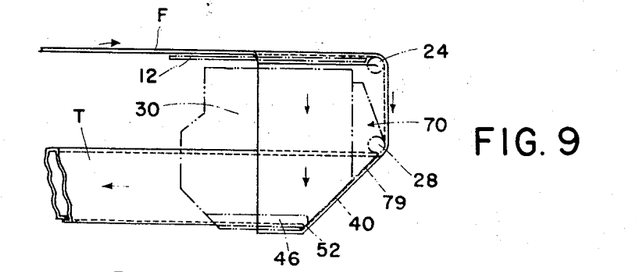
FIG. 9 is a diagrammatic side view of the film forming collar and the path of the film being folded over and passing around the apparatus.

A further important feature of the present invention is that the film F as fed to and pulled through the film forming collar 10 of the invention is believed to move or be held in slightly spaced relationship to certain portions of the top or guide plate 12 when passing thereover because of the center tension put on the film F by the top roll 24 in the movement of the film into and through the collar. Thus, FIG. 4 diagrammatically indicates that the film F, when being folded along the lines c–d and e–f, at the edges of the top plate, is partially spaced from such edges to provide a minimum of folding and moving friction on the sheet as it is moving over the top plate. Furthermore, the film also is believed to be elevated slightly above the top plate 12, as indicated in FIG. 9, when moving thereover. The film is fed to the top plate 12 from suitable means (not shown) to move upstream of the article flow path over the top plate 12. The marginal edges of the film F, as ultimately formed into the enclosure T, overlap each other slightly by the action of the rollers 64 in drawing marginal portions of the film laterally inwardly of the enclosure tube T.

Figure 8:
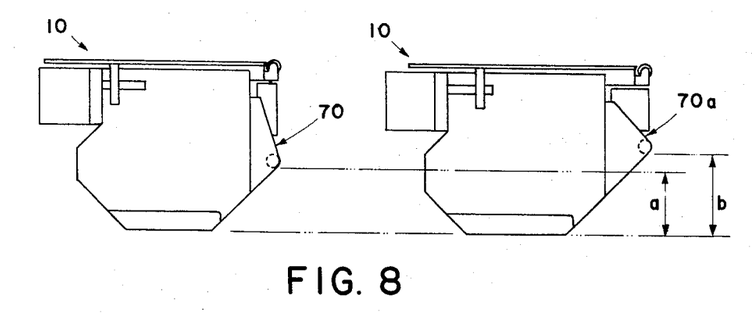
FIG. 8 is a diagrammatic view of the apparatus of the invention showing it with two different nose assemblies positioned thereon for enclosing or packaging articles of different heights.

The height of the containers which can be packaged by the apparatus of the invention by varying the specific construction of the nose assemblies 70 or 70a attached to the film forming collar 10 of the invention is indicated in FIG. 8 wherein containers of the height a can be packaged in the unit shown in the lefthand side of the drawing; whereas, other containers of the height b can be packaged in the embodiment of the invention shown on the righthand side of the drawing. The stream of articles would be fed into the bottom portion of the collar to be enclosed by the tube T in moving through the collar over the bottom plates 42 and 44.

Figure 10:
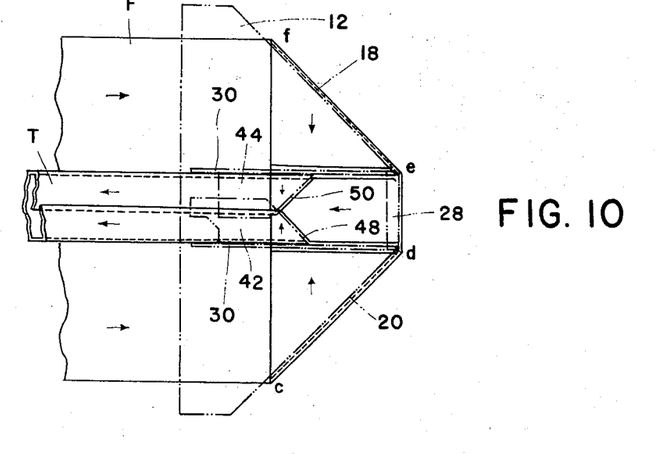
FIG. 10 is a diagrammatic bottom plan of the apparatus of the invention and indicating the plastic enclosure tube T as formed.
Figure 11:
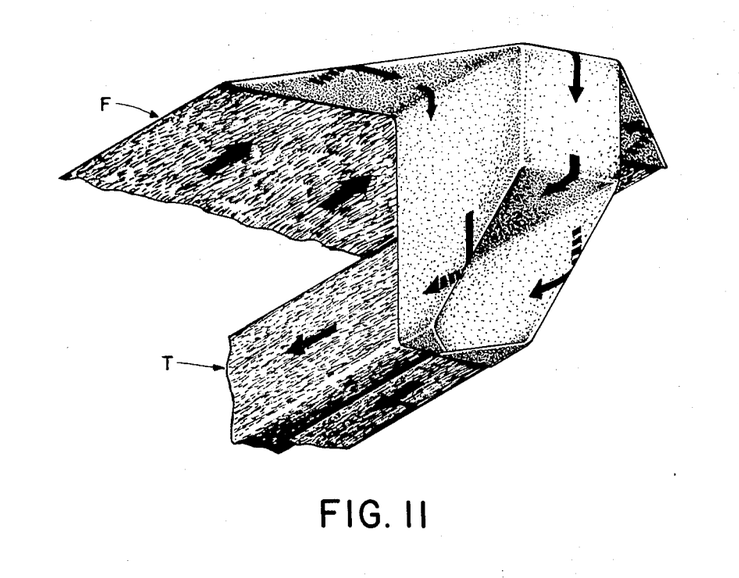
FIG. 11 is a perspective view of the path of the film as folded by the collar of the invention.

The path that the film follows in being processed by being drawn through or over the collar of the invention is clearly illustrated in FIGS. 9, 10 and 11 with arrows indicating the direction of movement of the various sections of the film as fed into and drawn through the apparatus. The arrows indicate the specific paths of different lateral portions of the strip of film. Parts of the film folding collar of the invention are omitted or shown diagrammatically in FIGS. 9 and 10. Also, parts of the apparatus of the invention have been omitted or have been shown diagrammatically in a number of figures of the drawings to facilitate showing the novel apparatus of the invention in operative form.

From the foregoing, it is believed to have been established that a novel and improved film forming collar has been provided by the invention. The film has special positioning members provided for it in the folding collar and the frictional contact of the film with the collar as being drawn therethrough is reduced to a minimum. Hence, it is believed that the objects of the invention have been achieved.

While one complete embodiment of the invention has been disclosed herein, it will be appreciated that modification of this particular embodiment of the invention may be resorted to without departing from the scope of the invention.

We claim:

1. In a film forming collar for shaping a film into an enclosure tube and including a top plate having a trapazoidal form with a short front end and a wide rear end and forwardly coverging side edges, a pair of parallel side plates depending from said top plate and being aligned with the margins of said front end, a film being led to such top plate from said rear end, guide bar means positioned under said top plate and adapted to be parallel when operative and extend rearwardly from said front end at the edges thereof to fold the film about said side edges, the film moving downwardly from said top plate to be formed into an enclosure, the improvement of a front roller operatively positioned at said front end to provide a film guide means thereat, said front end being recessed to receive said front roller whereby the film to be formed is led over said front roller to reduce the friction of passage of the film over said top plate and around said side edges, a center portion of the film moving downwardly over said front roller, a second roller positioned parallel to said front roller and below it for said film to move to, around and rearwardly from said second roller; and a nose assembly means positioned below said top plate at said front end, portions of said nose assembly being positioned in alignment with said side plates, and means for positioning said rollers on said nose assembly in a vertical plane.

2. In a film forming collar as in claim 1, the improvement comprising said portions of said nose assembly including edge plates having lower front corners forming angles of about 45° with a plane defined by said top plate, said front corners being adapted to have portions of the film led thereover and folded therearound.

3. In a film forming collar as in claim 2, the improvement comprising said nose assembly being removably secured in the film forming collar and cooperating therewith to shape a film pulled through the collar into an enclosure tube, the height of such tube being controlled by the relative position of said second roller in the collar whereby by changing the said nose assembly to a different nose assembly with a second roller therein at a different vertical spacing from said front roller a different height enclosure tube can be formed.

4. Apparatus for forming a continuous heat-shrinkable envelope around one or more abutted rows of objects, such as cans, as they are advanced into the apparatus, from a film or sheet of plastic or other material as it is moved through the apparatus comprised of a horizontally extending, substantially trapezoidal shaped film guide plate positioned to extend upstream in the apparatus, the side edges thereof forming 45° angles with the front edges thereof, a guide roller positioned at the front edge of said guide plate, a pair of parallel side plates mounted perpendicular to said guide plate and extending vertically downwardly therefrom, such side plates having forwardly positioned lower corners forming substantially 45° angles with the plane of said guide plate, a bottom plate operatively secured to the bottom edge of each said side plate and adapted to extend inwardly therefrom in substantially perpendicular relation thereto, the forward edge of each of said bottom plates being at an angle of about 45° to the lower edge of each side plate, a second guide roller positioned parallel to said first guide roller but below and spaced from said guide plate and extending between said side plates whereby a substantially rectangularly shaped opening is defined by said second guide roller, said side plates and said bottom plates into which said objects can be fed, a film passing through the apparatus having its center portion passing over said first guide roller and down to and around said second guide roller, movable guide means for continuously engaging a length of moving film and drawing it against the side edges of said guide plates wherein the film folds therearound, said guide means positioning marginal portions of the film for movement down along said side plates and around the corners of said side plates and said bottom plates to form a continuous envelope around the abutted objects passing into the opening, and a nose assembly means positioned below said guide plate at said front end, said nose assembly means having edge plates forming extensions of said side plates, and means for positioning both of said rollers on said nose assembly means.

5. In forming apparatus as in claim 4, the improvement comprising said edge plates having lower front corners forming angles of about 45° with the plane defined by said guide plate, said front corners being extensions of the lower corners of said side plates and being adapted to have portions of the film led thereover and folded therearound.

6. In a film forming collar as in claim 4, the improvement comprising said nose assembly being removably secured in the apparatus and cooperating therewith by said second guide roller to shape a film pulled through the apparatus into a tubular envelope, the height of such envelope being controlled by the relative position of said second guide roller in the apparatus whereby by changing nose assemblies a different height envelope can be produced.

7. In a film forming collar for shaping a film into an enclosure tube and including a top plate having a trapazoidal form with a short front end and a wide rear end and forwardly converging side edges, a pair of parallel side plates depending from said top plate and being aligned with the margins of said front end, a film being led forwardly to and over such top plate from said rear end, guide bar means positioned under said top plate and adapted to be parallel when operative and extend rearwardly from said front end at the edges thereof to fold the film about said side edges, the film moving downwardly from said top plate to be formed into an enclosure, the improvement of a front roller operatively positioned at said front end to provide a film guide means thereat, said front end being recessed to receive said front roller whereby the film to be formed is led over said front roller to reduce the friction of passage of the film over said top plate and around said side edges; and means for adjusting the position of said front roller in relation to the top plate front edge, said front roller having its top surface protruding above the plane of said top plate to take the tension on the film as led to and over said top plate and to position the film slightly above such top plate, a center portion of the film moving downwardly over said front roller.

8. In a film forming collar as in claim 7, the provision of a second roller positioned parallel to said front roller and below it for said film to move to, around and rearwardly from said second roller.

9. Apparatus as in claim 4 wherein said bottom plates have vertically upwardly extending edge flanges portions of which combine with portions of said edge plates and with said corners of said side plates to form film folding edges in the apparatus for folding laterally spaced portions of film therearound as it moves through the apparatus.

10. Apparatus as in claim 9 where said edge flanges of said guide plates each include a section extending vertically upwardly from said flange portions that form film folding edges in the apparatus.

* * * * *

UNITED STATES PATENT OFFICE
CERTIFICATE OF CORRECTION

Patent No. 3,780,628     Dated December 25, 1973

Inventor(s)  Robert W. McGill and P. Eric Painter

It is certified that error appears in the above-identified patent and that said Letters Patent are hereby corrected as shown below:

Column 3, line 50, after "swung" insert --in--.

Column 4, line 34, change "46" to --56--.

Signed and sealed this 9th day of April 1974.

(SEAL)
Attest:

EDWARD M.FLETCHER,JR.　　　　　　C. MARSHALL DANN
Attesting Officer　　　　　　　　　Commissioner of Patents